(12) United States Patent
Okamoto et al.

(10) Patent No.: US 8,521,651 B2
(45) Date of Patent: Aug. 27, 2013

(54) DIGITAL CONTENT REPRODUCING APPARATUS AND METHOD THEREOF

(75) Inventors: Ryuichi Okamoto, Kadoma (JP);
Susumu Kobayashi, Kyotanabe (JP);
Katsumi Tokuda, Ikeda (JP)

(73) Assignee: Panasonic Corporation, Osaka (JP)

( * ) Notice: Subject to any disclaimer, the term of this patent is extended or adjusted under 35 U.S.C. 154(b) by 1552 days.

(21) Appl. No.: 10/542,362

(22) PCT Filed: Apr. 7, 2004

(86) PCT No.: PCT/JP2004/004980
§ 371 (c)(1),
(2), (4) Date: Jul. 14, 2005

(87) PCT Pub. No.: WO2004/092933
PCT Pub. Date: Oct. 28, 2004

(65) Prior Publication Data
US 2006/0129495 A1  Jun. 15, 2006

(30) Foreign Application Priority Data
Apr. 11, 2003  (JP) .................................. 2003-107594

(51) Int. Cl.
*G06Q 20/00* (2012.01)
(52) U.S. Cl.
USPC ................... 705/59; 705/50; 705/51; 705/52; 705/54
(58) Field of Classification Search
USPC .......................................... 705/50–52, 54, 59
See application file for complete search history.

(56) References Cited

U.S. PATENT DOCUMENTS

| | | | | |
|---|---|---|---|---|
| 5,638,443 A | * | 6/1997 | Stefik et al. | 705/54 |
| 5,892,900 A | * | 4/1999 | Ginter et al. | 726/26 |
| 5,949,876 A | * | 9/1999 | Ginter et al. | 705/80 |
| 6,640,304 B2 | * | 10/2003 | Ginter et al. | 713/193 |
| 2001/0041061 A1 | | 11/2001 | Nakagawa | |

FOREIGN PATENT DOCUMENTS

| | | |
|---|---|---|
| EP | 0 715 246 | 6/1996 |
| JP | 8-054951 | 2/1996 |
| JP | 2000-048076 | 2/2000 |
| JP | 2001-359069 | 12/2001 |
| JP | 2002-044071 | 2/2002 |
| JP | 2002-163466 | 6/2002 |
| JP | 2002-344921 | 11/2002 |

OTHER PUBLICATIONS

"Open Digital Rights Language (ORDL) Version 1.1", W3C Note Sep. 19, 2002, 72 pages.*

* cited by examiner

*Primary Examiner* — James D Nigh
(74) *Attorney, Agent, or Firm* — Wenderoth, Lind & Ponack, L.L.P.

(57) ABSTRACT

A user terminal (110) having a license purchase unit (603) obtaining a license (500) indicating a content usable time (502) of a content data (200) composed of a plurality of elements (203), each of which can be replayed individually. The user terminal (110) also having an availability judgment unit (604) judging whether or not encrypted elements (203) included in the content data (200) are available, based on the content usable time (502) indicated in the obtained license (500), and having a replay/display unit (607) replaying the encrypted elements judged as available. In addition, the user terminal (110) having a use status management unit (608) specifying license-consuming elements, each of which consumes an authorized amount of replay under right, out of the elements that are being replayed, and measuring a content used time (504) consumed by replaying the specified license-consuming elements.

10 Claims, 20 Drawing Sheets

| Element ID | Element type | Offset (byte) | Element size (byte) |
|---|---|---|---|
| XXX001 | Music data | 96000 | 512000 |
| XXX002 | Lyric data | 608000 | 64000 |
| XXX003 | Image data for album jacket | 672000 | 192000 |
| ..... | ..... | ..... | ..... |

| Element ID | License consumption flag |
|---|---|
| XXX001 | Consume license |
| XXX002 | Does not consume license |
| XXX003 | Does not consume license |
| ⋮ | ⋮ |

FIG. 15

| Element ID | Degree of license consumption |
|---|---|
| XXX001 | Consume half |
| XXX002 | Consume double |
| XXX003 | Does not consume license |
| ⋮ | ⋮ |

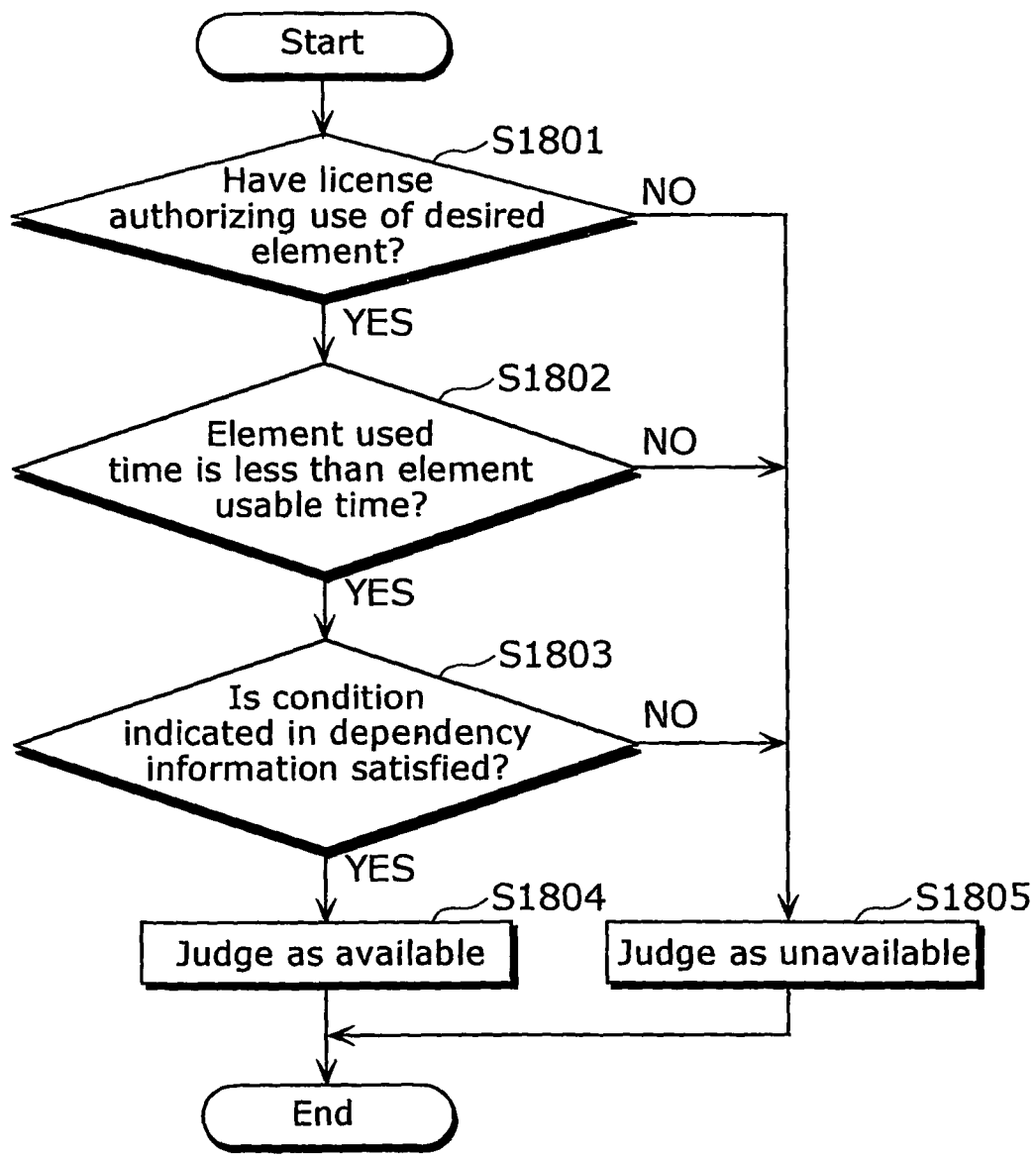

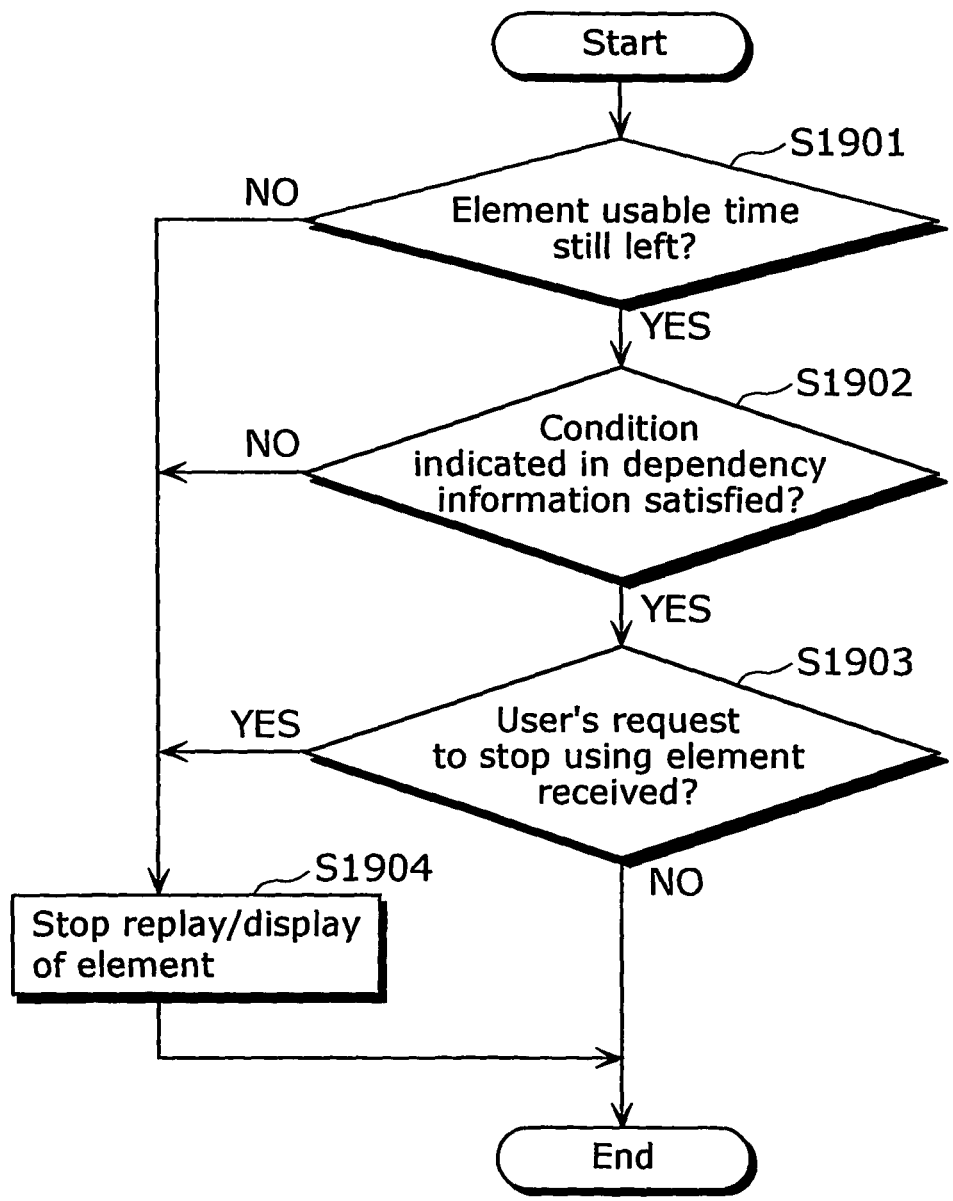

DIGITAL CONTENT REPRODUCING APPARATUS AND METHOD THEREOF

BACKGROUND OF THE INVENTION

1. Field of the Invention

The present invention relates to a digital content reproducing apparatus and, in particular, to a digital content reproducing apparatus which can protect rights relating to digital contents.

2. Background of the Related Art

Systems for distributing digital copyrighted works such as music, video, games and others via the Internet or digital broadcasting have recently been developed, and some of the systems face a stage of practical application. For a distribution of such contents, a method of controlling a content use for limiting reproduction frequency, transfer, and duplication of the distributed contents is also considered in view of copyright protection.

Under the conventional digital content distribution system, as is disclosed in Japanese Laid-Open Application No. 08-54951, use conditions for a content used by each user are distributed to a user terminal together with the content, and the user terminal manages a use of the content based on the distributed use conditions.

For example, in the case where the user purchased a right to watch a movie "EIGA" for an hour, the user terminal receives a content of the movie "EIGA" as well as the use conditions indicating that "a user can watch the "EIGA" for an hour", and manages a replay of the content according to the use conditions. In this case where the user terminal replays the content "EIGA", the time taken for the replay is measured so that the use is prohibited when the total replay time has reached one hour.

However, the conventional art does not consider sufficiently the use control in a case where a content is composed of plural elements. This poses a problem that the content is not available against a user's will. To be more specific, for example, in a case of using the content consisting of tune data, lyric data, and image data of an artist, the user cannot replay the tune data which he or she desires to use the most since the right to use the content is completely expired due to the long browsing of the lyric data.

BRIEF DISCLOSURE OF INVENTION

An object of the present invention, in view of such circumstances, is to provide a system that realizes proper control over use of content that is composed of plural elements.

In order to achieve the above object, the digital content reproduction apparatus according to the present invention for reproducing a content according to license information which authorizes the reproduction of the content comprises: a license information obtainment unit operable to obtain the license information indicating an authorized amount of reproduction for a content composed of a plurality of elements that can be reproduced individually; a reproducibility judgment unit operable to judge whether or not said plurality of elements included in the content are authorized to be reproduced, based on the authorized amount of reproduction indicated in the obtained license information; and a reproduction unit operable to reproduce one or more of said plurality of elements in the case where it is judged that said plurality of elements are authorized to be reproduced, and not to reproduce said one or more elements in the case where it is judged that said plurality of elements are not authorized to be reproduced.

The reproducibility judgment unit may specify one or more license-consuming elements, each of which consumes said authorized amount of reproduction during reproduction, out of said one or more elements that are being reproduced, and judges whether or not said plurality of elements in the content are authorized to be reproduced, based on an amount used for reproducing the specified license-consuming elements and said authorized amount of reproduction.

The license information may further include license-consuming element information indicating one or more license-consuming elements included in each content, and the reproducibility judgment unit may include: a consumed amount calculation unit operable to specify one or more license-consuming elements that are being reproduced, based on the license-consuming element information, and calculate a consumed amount within said authorized amount of reproduction, based on said amount used for reproducing the specified license-consuming elements; and a comparison unit operable to compare said authorized amount of reproduction and the calculated consumed amount, said authorized amount of reproduction being indicated in the obtained license information. The reproducibility judgment unit may judge, based on a result of the comparison, i) that said plurality of elements in the content are authorized to be reproduced so far as the consumed amount is less than said authorized amount of reproduction, and ii) that said plurality of elements in the content are not authorized to be reproduced in a case where the consumed amount surpasses said authorized amount of reproduction.

The authorized amount of reproduction may be represented as an amount authorized for reproducing each element included in the content, and the reproducibility judgment unit may include a comparison unit operable to compare the authorized amount of reproduction for said each element and an amount used for reproducing said each element, said authorized amount of reproduction being indicated in the obtained license information. The reproducibility judgment unit may judge, based on a result of the comparison, i) that said each element is authorized to be reproduced so far as the consumed amount is less than said authorized amount of reproduction, and ii) that said each element is not authorized to be reproduced in a case where the consumed amount surpasses said authorized amount of reproduction.

The authorized amount of reproduction may further include another element dependency condition that is set for each element for deciding whether or not said each element included in the content is authorized to be reproduced, depending on whether or not other specified elements included in the same content are authorized to be reproduced, and the reproducibility judgment unit may judge that said each element is not authorized to be reproduced even when an amount used for reproducing said each element is less than said authorized amount of reproduction, in a case where it is judged that the specified elements indicated in the other element dependency condition that is set for said each element are not authorized to be reproduced.

As is described above, the present invention is effective to appropriately control the use of the content that is composed of plural elements.

It should be noted that the present invention can be realized as such a digital content distribution system, but also as a single unit such as a right management server and a user terminal, both of which constitutes the digital content distribution system, or as a right management method in which the characteristic operations in the digital content distribution system are performed as steps, and even as a program which causes a general-purpose computer to execute the characteristic operations. The program can be surely distributed via a computer-readable storage medium such as a CR-ROM and the like or a transmission medium such as the Internet and the like.

For further information about technical background to this application, Japanese Patent Application No. 2003-107594 filed on 11 Apr., 2003 is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the drawings:

FIG. 3 shows an example of the element management information shown in FIG. 2;

FIG. 4 shows an example of license-consuming element specification information;

FIG. 15 shows another example of the license-consuming element specification information shown in FIG. 4;

FIG. 20 is a flowchart showing the operation of the availability judgment process shown in FIG. 19; and FIG. 21 is a flowchart showing the operation used in the element-in-use process, as shown in FIG. 19.

DETAILED DESCRIPTION OF THE INVENTION

First Embodiment

Figure 1:
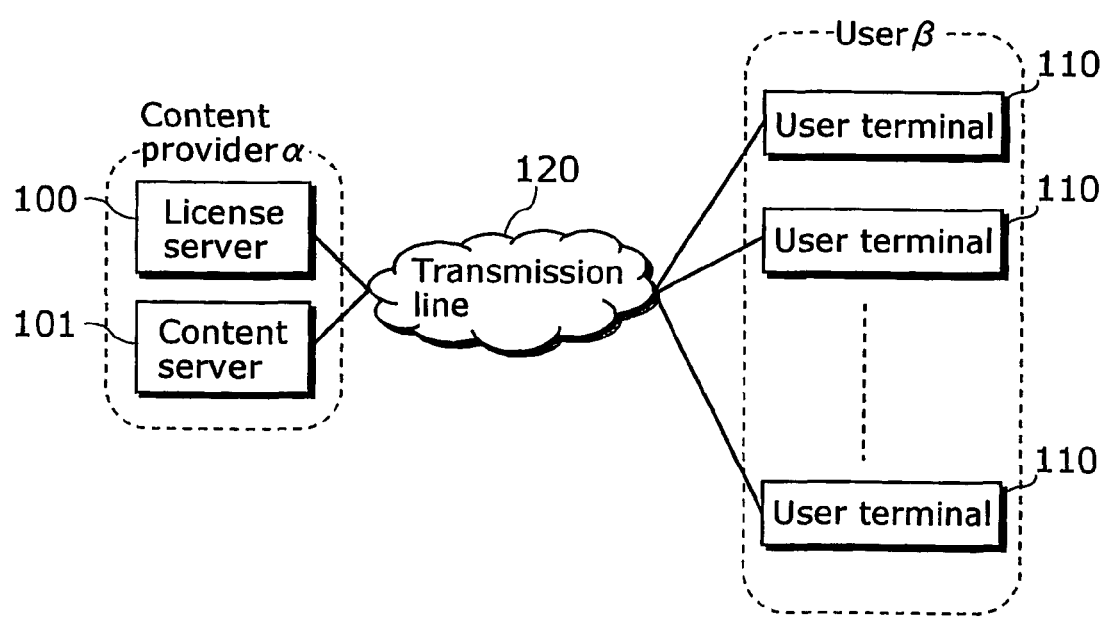
FIG. 1 shows an overall configuration of the digital content distribution system according to a first embodiment of the present invention.

FIG. 1 is a block diagram showing the overall configuration of the digital content distribution system according to the first embodiment of the present invention. As shown in FIG. 1, the digital content distribution system has at least one license server 100, at least one content server 101, at least one user terminal 110, and a transmission line 120. The following describes each of the components in the digital content distribution system. It should be noted that the same referential marks are put for the components which are already mentioned, and the description is omitted.

Figure 5:
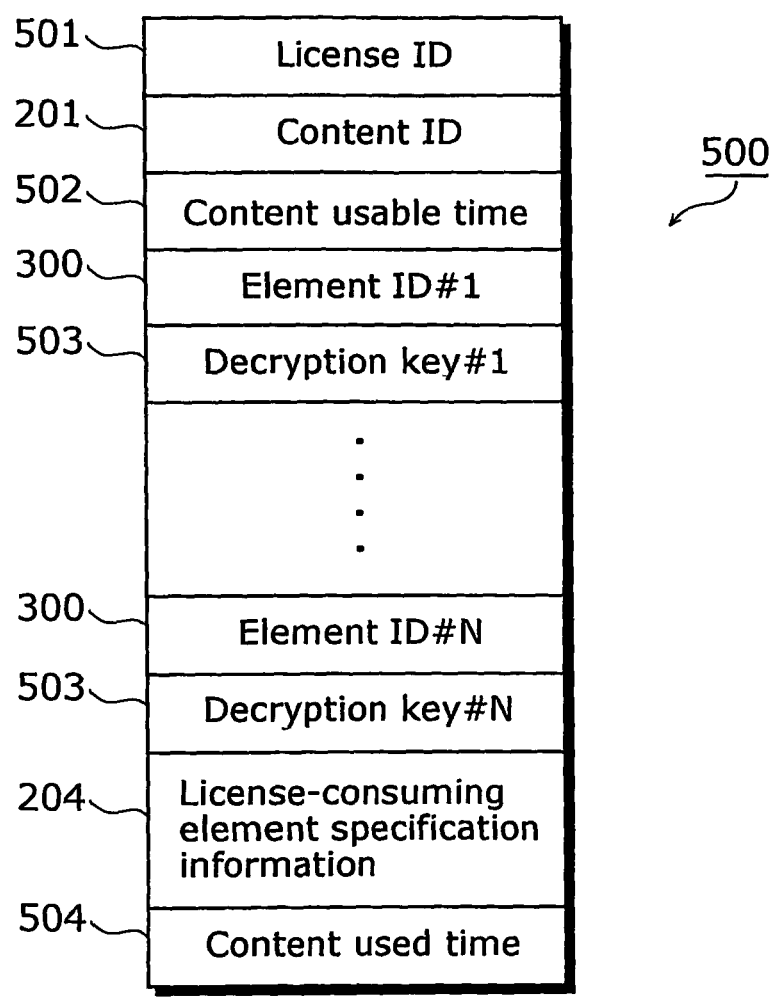
FIG. 5 shows an example of the license distributed from the license server to the user terminal in the system shown in FIG. 2.

The license server 100, being set on the side of a content provider α, manages a right to use each content (hereafter referred to as "right"), and distributes a license 500 shown in FIG. 5 according to a license purchase request sent from the user terminal 110, after necessary operation such as charging for the purchased license or the like. The license 500 will be explained in detail later on.

The content server 101 is set on the side of the content provider α, as is the case of the license server 100, and distributes content data 200 to the user terminal 110.

Figure 2:
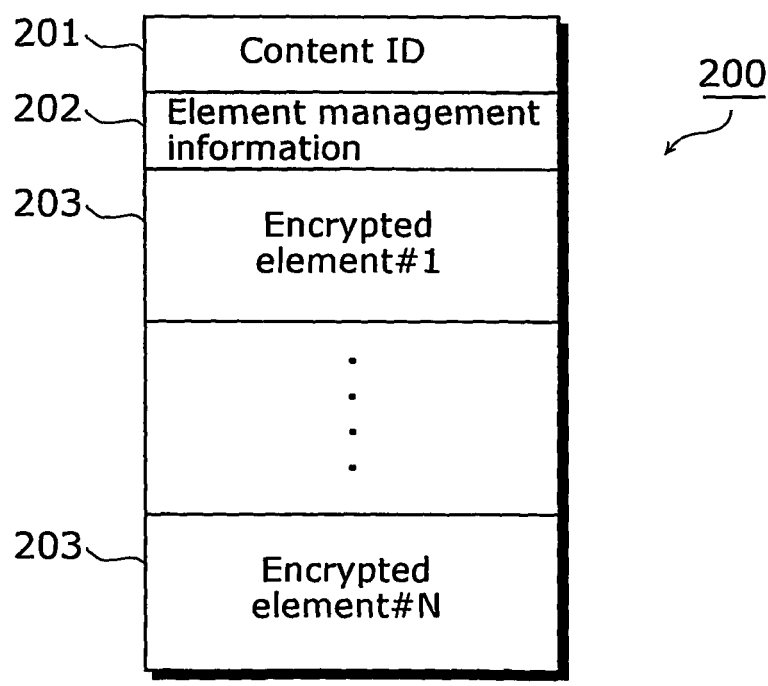
FIG. 2 shows an example of the content data distributed by the content server shown in FIG. 1.

FIG. 2 shows an example of the content data 200 distributed by the content server 101 shown in FIG. 1. As shown in FIG. 2, the content data 200 is composed of a content ID 201, element management information 202 and "N" number of encrypted elements 203. Here, "N" is an integer larger than or equal to 1. The content ID 201 is an ID for uniquely specifying the content data 200 in the digital content distribution system. The element management information 202 is information for managing the encrypted elements 203 included in the content data 200. The encrypted elements 203 include music, video, lyric data and other data in encrypted form.

FIG. 3 shows an example of the element management information 202 shown in FIG. 2. As shown in FIG. 3, the element ID 300 uniquely specifies each encrypted element 203 included in the content data 200. The element type 301 is information indicating a type of each encrypted element 203 such as "music data", "movie data" and others. The offset 302 is offset information indicating a distance between a head of the content data 200 and the encrypted element 203. The element size 303 indicates a size of the encrypted element 203. In FIG. 3, for example, an encrypted element 203 whose element ID 300 is "xxx001" has an element type 301 indicating "music data", an offset 302 indicating "96000 bytes" and an element size 303 indicating "512000 bytes".

FIG. 4 shows an example of license-consuming element specification information 204. As shown in FIG. 4, the license-consuming element specification information 204 indicates the encrypted elements 203 which consume the license among the encrypted elements 203 included in the content data 200.

As shown in FIG. 4, an element ID 300 is as same as the element ID 300 in the element management information 202 and a license consumption flag 400 is a flag that indicates whether or not each encrypted element 203 consumes license. FIG. 4 shows that the encrypted element 203 with the element ID 300 "xxx001" consumes license while the encrypted elements 203 with the element IDs "xxx002" and "xxx003" do not.

Back to FIG. 1, the user terminal 110 is set on the side of a user β and receives content distribution services.

The transmission line 120 is a wired or wireless line which connects the license server 100, the content server 101 and the user terminal 110 so as to transmit data.

It should be noted that, in the present embodiment, the license server 100 and the content server 101 are set on the side of the same content provider α. However, they may be managed respectively by different content providers. Also, the license server 100 and the content server 101 are described as different servers, but they may be the same server.

The following describes the license 500 distributed from the license server 100 to the user terminal 110 with reference to FIG. 5. FIG. 5 shows an example of the license 500 distributed from the license server 100 to the user terminal 110. The license 500 is composed of the following: a license ID 501; a content ID 201; a content usable time 502; N sets being composed of the element ID 300 and a decryption key 503; the license-consuming element specification information 204 shown in FIG. 4; and a content used time 504. The license ID 501 uniquely specifies each license 500 under the digital content distribution system. The ID of the content data 200 to which the license 500 is applicable is described in the content ID 201. The content usable time 502 is information indicating the time during which a use of the content is authorized. The decryption key 503 is a key to decrypt each encrypted element 203 specified by each element ID 300. The content used time 504 is the time actually spent for the use of the content. The content used time 504 with an initial value "0" is updated each time the content is actually used, and it is judged that the content use is authorized under the license 500 until the value indicated in the content used time 504 reaches the value indicated in the content usable time 502. It should be noted that the content used time 504 may not exist at the stage where the license 500 is distributed from the license server 100 to the user terminal 110, and may be added after the user terminal 110 have received the license 500.

Figure 6:
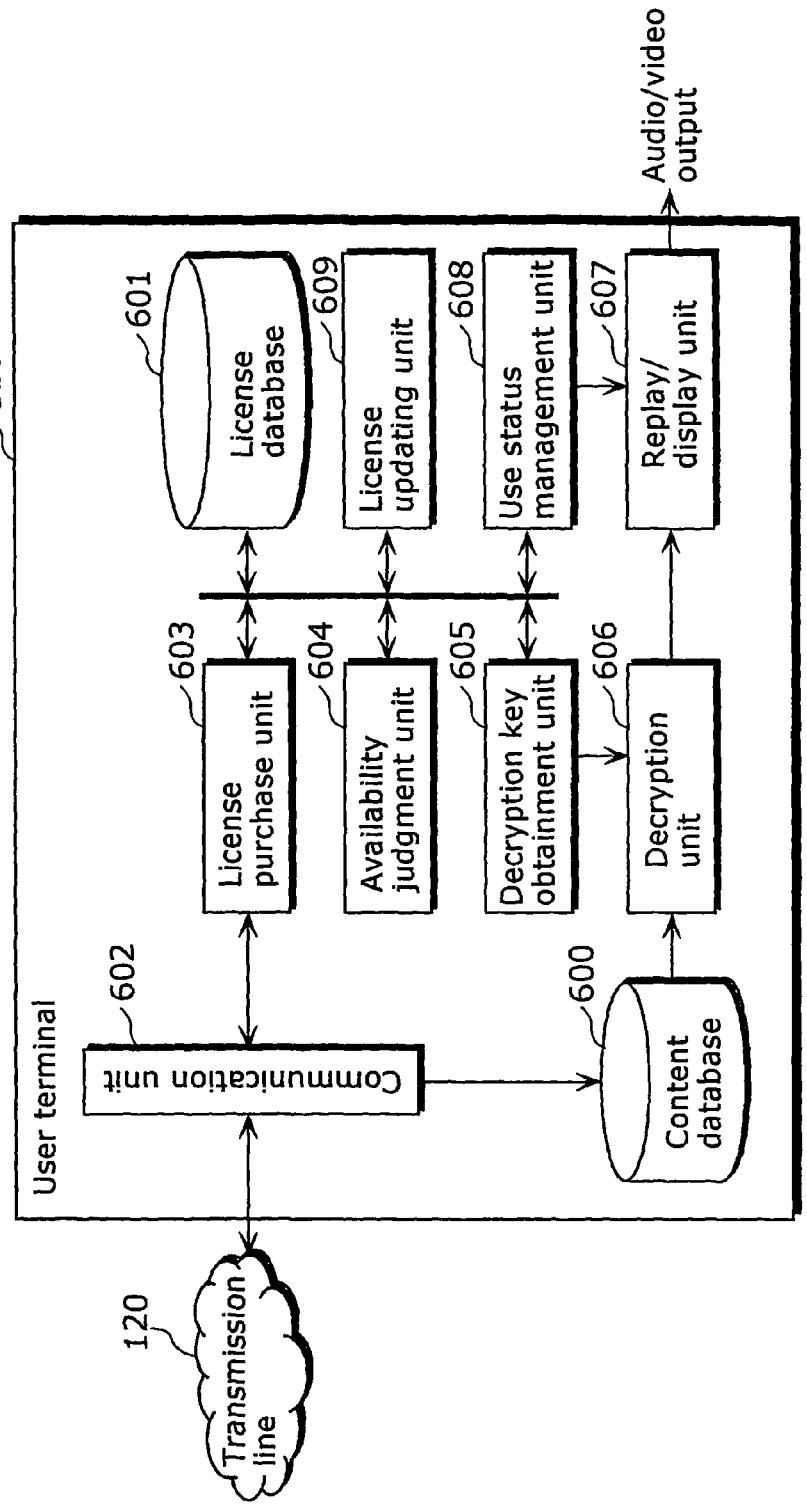
FIG. 6 is a block diagram showing the configuration of the user terminal shown in FIG. 1.

The following describes in detail the configuration of the user terminal 110 with reference to FIG. 6. FIG. 6 is a block diagram showing the configuration of the user terminal 110 shown in FIG. 1. As shown in FIG. 6, the user terminal 110 is composed of a content database 600, a license database 601, a communication unit 602, a license purchase unit 603, an availability judgment unit 604, a decryption key obtainment unit 605, a decryption unit 606, a replay/display unit 607, a use status management unit 608, and a license updating unit 609. The following explains each of the components included in the user terminal 110.

The content database 600 manages the content data 200 distributed from the content server 101.

The license database 601 securely manages the license 500 distributed from the license server 100.

The communication unit 602 communicates with the license server 100 and the content server 101 via the transmission line 120.

The license purchase unit 603 sends a license purchase request to the license server 100 and acquires the license 500.

The availability judgment unit 604 refers to the content used time 504 as well as the content usable time 502 included in the license 500, and judges whether the content is available or not.

The decryption key obtainment unit 605 takes out a required decryption key 503 from the license 500 stored in the license database 601.

The decryption unit 606 takes out the content data 200 from the content database 600, and decrypts the encrypted element 203 taken out from the content data 200, using the decryption key 503 obtained by the decryption key obtainment unit 605.

The replay/display unit 607 replays or displays the encrypted element 203 decrypted by the decryption unit 606. More specifically, in the case where the encrypted element 203 to be replayed is, for example, a music element, the replay/display unit 607 generates sound data by extending compression of the coded data obtained by decrypting the encrypted element 203, and outputs the generated sound data to a speaker. In the case where the encrypted element 203 to be replayed is, for example, a video element, the replay/display unit 607 generates video data by performing the same processing as performed for the music element, and outputs the generated video data to a monitor.

The use status management unit 608 measures the time used for each of the elements included in the content, and stops the use of the content, if necessary, for instance, when the right to use the content is completely used. It should be noted that the use status management unit 608 measures the time during which the license-consuming elements are used as the time during which the content is used.

The license updating unit 609 updates the license 500 stored in the license database 601. More specifically, the content used time 504 in the license 500 is updated when the content is used.

Figure 7:
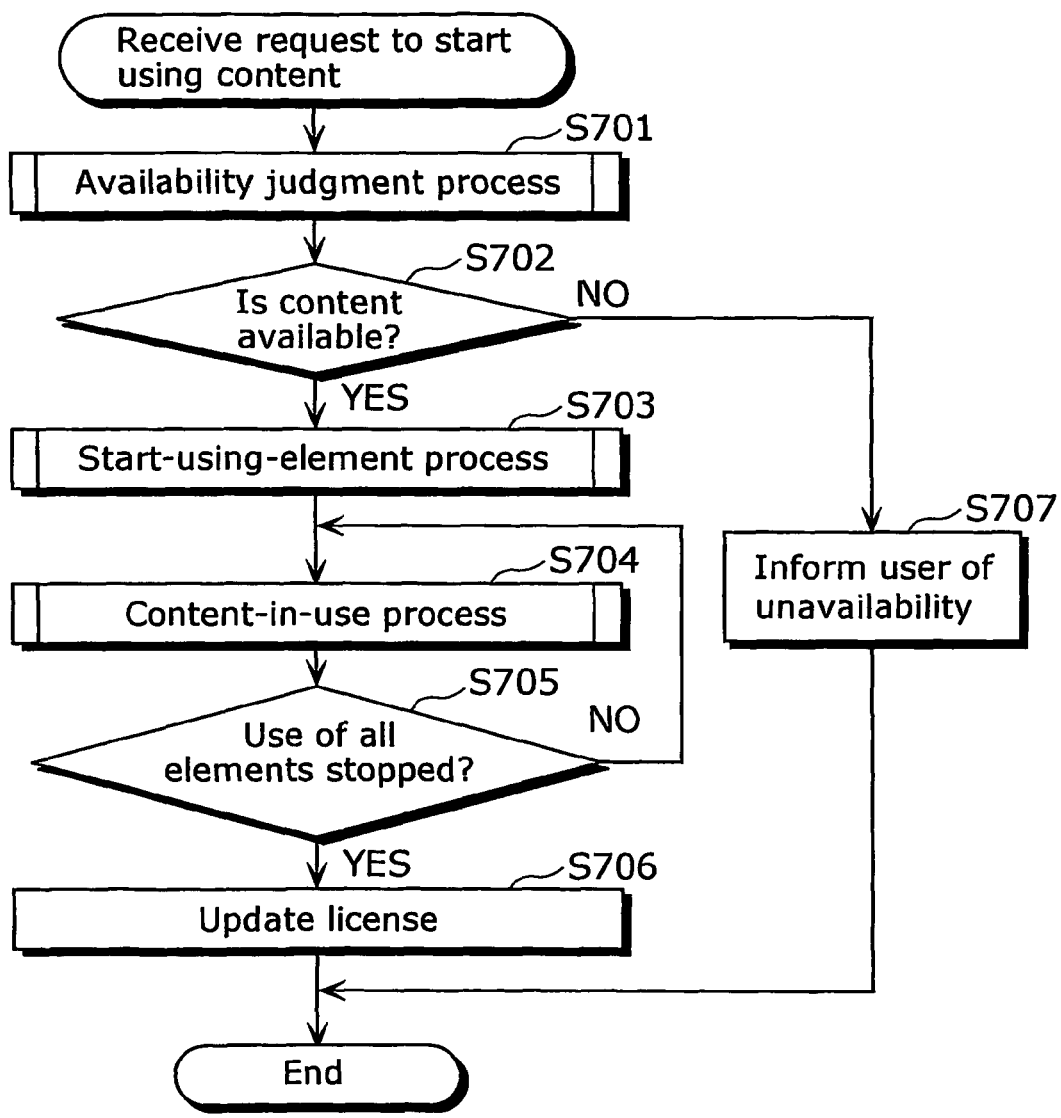
FIG. 7 is a flowchart showing the user's operation of using a content.
Figure 8:
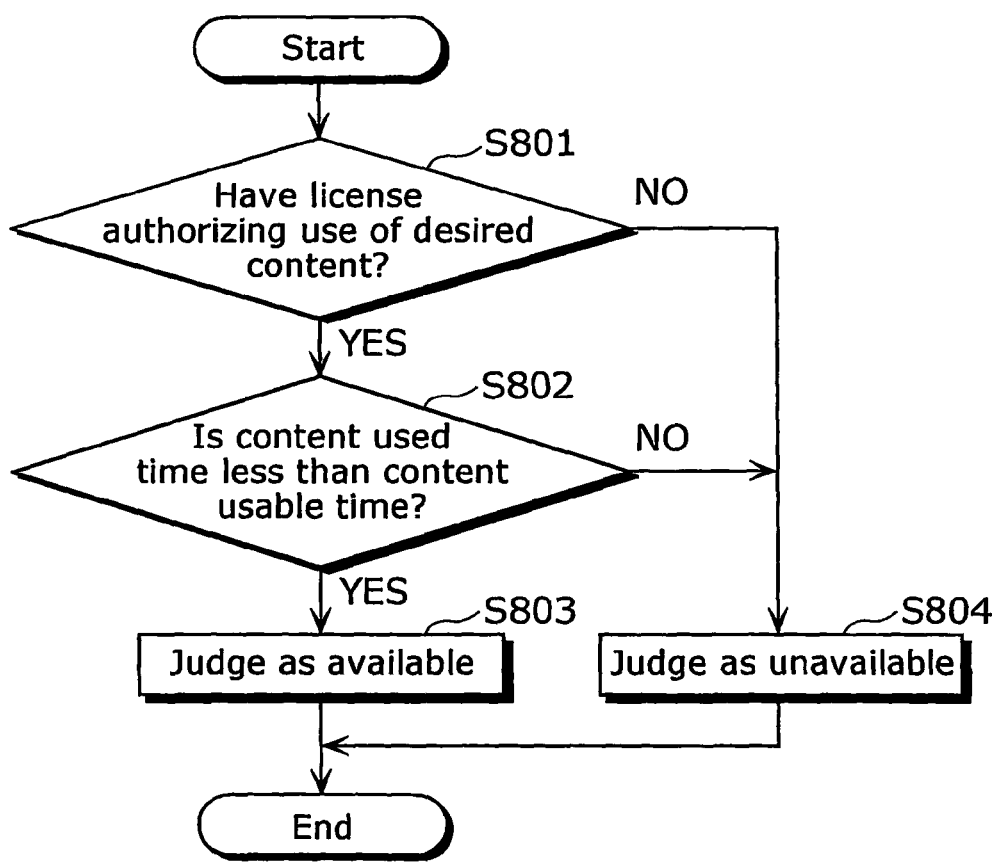
FIG. 8 is a flowchart showing the operation used in the availability judgment process shown in FIG. 7.
Figure 9:
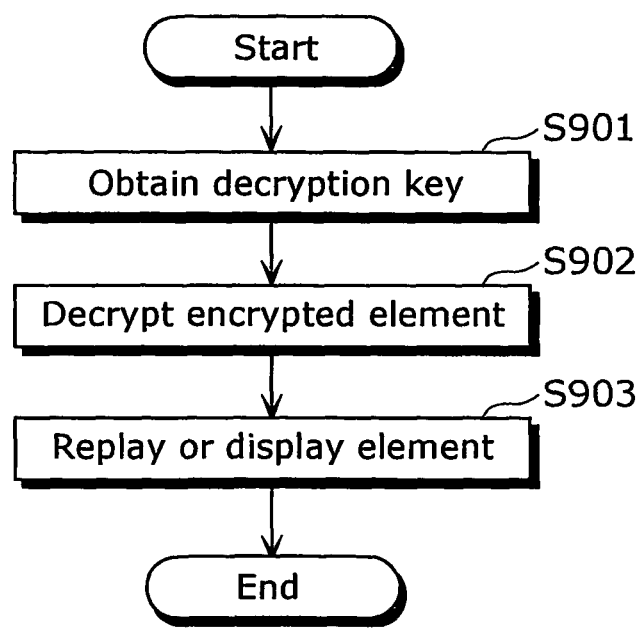
FIG. 9 is a flowchart showing the operation, used in the start-using-element process shown in FIG. 7.
Figure 10:
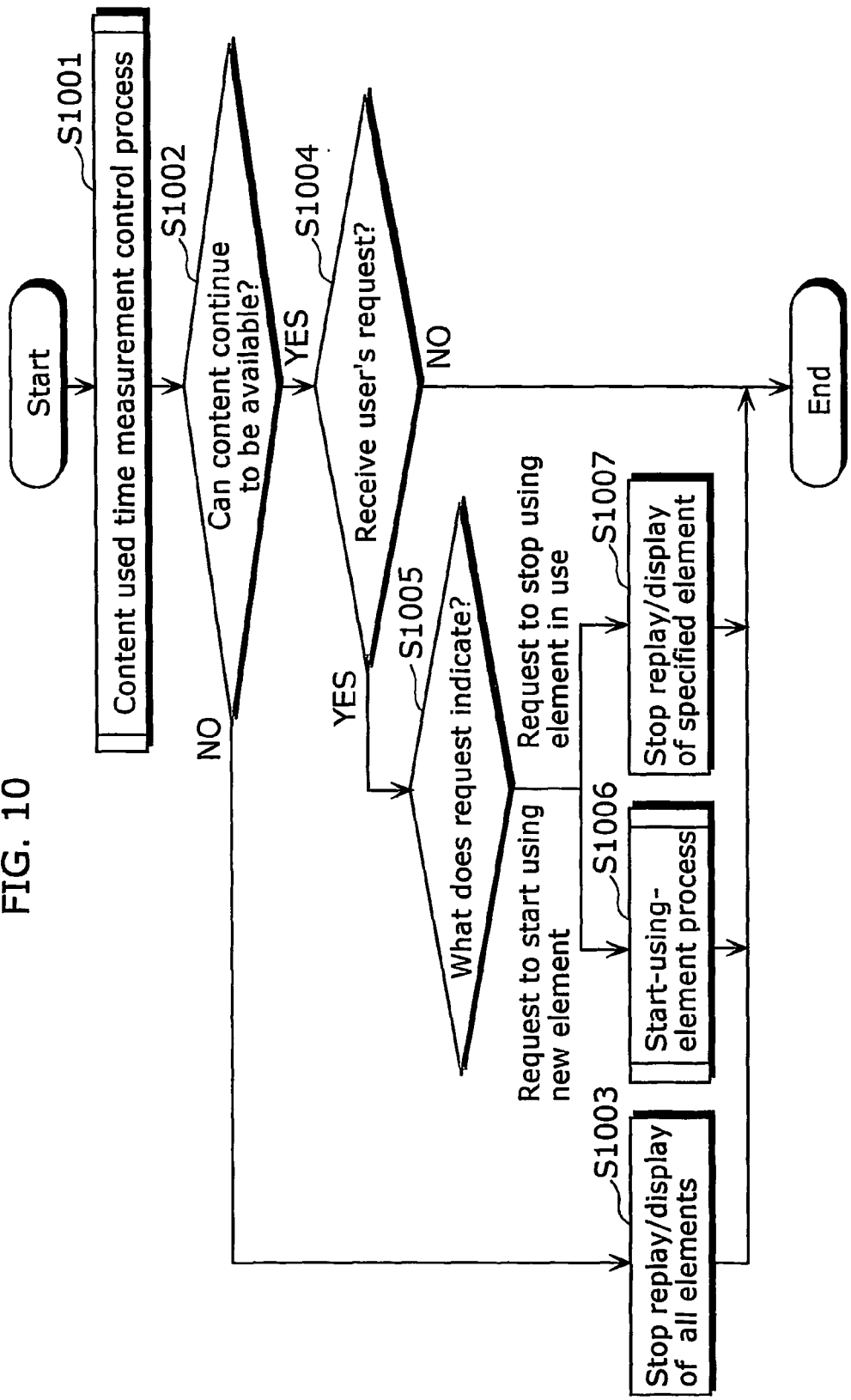
FIG. 10 is a flowchart showing the operation, used in the content-in-use process shown in FIG. 7.

The following describes the operation of the digital content distribution system according to the present embodiment with reference to the flowcharts in FIGS. 7, 8, 9 and 10. FIG. 7 is a flowchart showing the operation used in the process of starting a use of a content (to be referred to as "start-using-content process"), performed by the user terminal 110. FIG. 8 is a flowchart showing the operation used in the process of availability judgment. FIG. 9 is a flowchart showing the operation used in the process of starting a use of an element (to be referred to as "start-using element process"). FIG. 10 is a flowchart showing the operation used in the process while the content is in use (to be referred to as "content-in-use process").

Firstly, the operation of the user terminal 110 for using the content is described with reference to the flowchart in FIG. 7.

The availability judgment unit 604 receives a request to start using a content from the user β through the user's operation input unit such as a keyboard that is not shown in the diagram, and starts the following processing. The start-using-content request sent from the user β includes information for specifying the content or element which the user desires to start using.

S701: The availability judgment unit 604 judges whether or not the content is available by performing the availability judgment process which is to be mentioned later with reference to the flowchart in FIG. 8.

S702: In a case where the availability judgment unit 604 judges that the content is available in S701, the process goes on to S703. In a case where the availability judgment unit 604 judges that the content is unavailable, the process goes on to S707.

S703: The start-using-element process, which is to be mentioned later with reference to FIG. 9, is operated, and the use of the element requested by the user starts.

S704: The content-in-use process which is to be mentioned later with reference to the flowchart in FIG. 10 is performed.

S705: The use status management unit 608 judges whether or not use of all the elements is stopped. In a case where use of all the elements is stopped, the process goes on to S706. In the case where some elements are found to be still in use, the process returns to S704.

S706: The license updating unit 609 updates the content used time 504 in the license 500 based on the time used for the content use, measured by the use status management unit 608, in the content-in-use process in S704.

S707: The user is informed that the content is unavailable.

The following describes the availability judgment process of S701 in FIG. 7 with reference to the flowchart in FIG. 8.

S801: The availability judgment unit 604 examines whether or not the license database 601 has the license 500 authorizing the use of the content which the user β desires to use. In a case where such license 500 is found, the process goes on to the S802. In a case where such license 500 is not found, the process goes on to the S804.

S802: The availability judgment unit 604 judges whether or not the content used time 504 of the license 500 authorizing the use of the content the user β desires to use is less than the content usable time 502. In a case where the content used time 504 is less than the content usable time 502, the process goes on to S803. In a case where the content used time 504 is not less than the content usable time 502, the process goes on to S804.

S803: The availability judgment unit 604 judges that the content is available.

S804: The availability judgment unit 604 judges that the content is unavailable.

The following describes the start-using-element process of S703 in FIG. 7 with reference to the flowchart in FIG. 9.

S901: The decryption key obtainment unit 605 takes out, from the license 500 stored in the license database 601, the decryption key 503 for the encrypted element 203 which the user β desires to use.

S902: The decryption unit 606 takes out the encrypted element 203 which the user β desires to use, from the content data 200 stored in the content database 600, and decrypts it using the decryption key 503 obtained by the decryption key obtainment unit 605 in S901.

S903: The replay/display unit 607 replays or displays the encrypted element 203 decrypted by the decryption unit 606 in S902

The following describes the content-in-use process in S704 in FIG. 7 with reference to the flowchart in FIG. 10.

Figure 11:
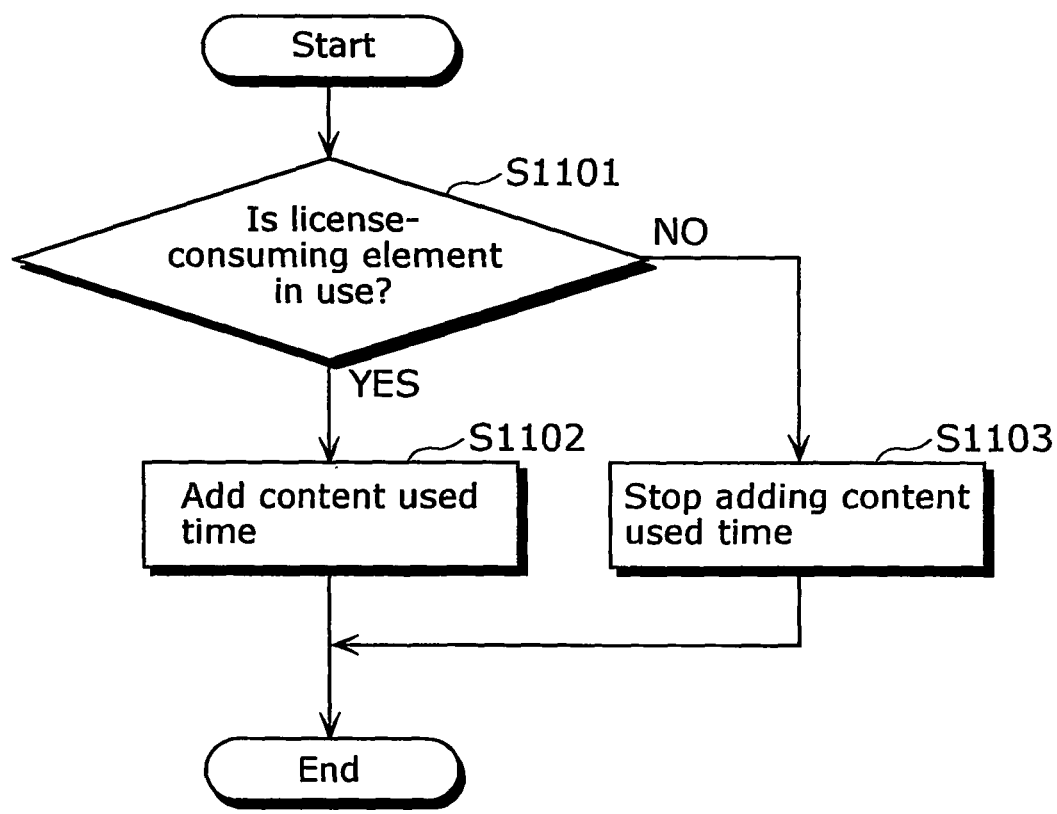
FIG. 11 is a flowchart showing the operation used in the content used time measurement control process shown in FIG. 10.

S1001: The content used time measurement control process, which is to be mentioned later with reference to the flowchart in FIG. 11, is operated.

S1002: The use status management unit 608 judges whether or not the content continues to be available. It should be noted that the judgment for the continuation of the content use is made based on whether or not the condition expressed in equation 1 is satisfied. In a case where the condition is satisfied, the use status management unit 608 judges that the content remains available, and in a case where the condition is not satisfied, the use status management unit 608 judges that the content is no longer available.

(content used time measured by the use status management unit 608)<(content usable time 502 of the license 500 authorizing the content use)−(content used time 504 of the license 500 authorizing the content use)    (equation 1)

In S1002, in a case where the use status management unit 608 judges that the content remains to be available, the process goes on to S1004, and in a case where the use status management unit 608 judges that the content is no longer available, the process goes on to S1003.

S1003: The use status management unit 608 instructs the replay/display unit 607 to stop the replay or display of all the elements. The replay/display unit 607 stops the replay or display of all the elements according to the instruction from the use status management unit 608.

S1004: The use status management unit 608 judges whether or not a request relating to the use of an element is received from the user β. In a case where the request is received from the user β, the process goes on to S1005. In a case where the request is not received from the userβ, the content-in-use process terminates.

S1005: In a case where the request received from the user β is a request to start using a new element, the process goes on to S1006. In a case where the request received from the user β is a request to stop using the element in use, the process goes on to S1007.

S1006: The start-using-element process described with reference to FIG. 9 is performed, and the replay or display of the element starts as instructed by the user.

S1007: The use status management unit 608 instructs the replay/display unit 607 to stop the replay or display of the element of which the user β instructs to stop the use. The replay/display unit 607 stops the replay or display of the element according to the instruction sent from the use status management unit 608.

The following describes the content used time measurement control process of S1001 in FIG. 10 with reference to the flowchart in FIG. 11. FIG. 11 is a flowchart showing the operation used in the content used time measurement control process.

S1101: The use status management unit 608 refers to the license-consuming element specification information 204 included in the license 500 in use, and judges whether the license-consuming element is in use or not. In a case where the license-consuming element is in use, the process goes on to S1102. In a case where the license-consuming element is not in use, the process goes on to S1103.

S1102: The use status management unit 608 adds time to the content used time for each of the license-consuming elements that are in use. More specifically, when performing the processing of S1102 for the first time after the instruction to start the use of a content is received, the use status management unit 608, for example, activates a timer which measures an elapsed time with the initial value set as "0". When operating the processing of S1102, the use status management unit 608 then adds, for each of the license-consuming elements that are in use, the elapsed time measured up to then to a register for measuring the content used time, and allows the timer to start measuring an elapsed time starting from the value "0". Note here that the initial value in the register is "0". Also, (content used time measured by the use status management unit 608) in the equation 1 is assumed to be a total amount of each elapsed time measured by each register for each of the license-consuming elements used up to then.

S1103: The use status management unit 608 stops adding the content used time. To be more specific, each register, to which the elapsed time is added for each of the license-consuming elements, holds the value of the added elapsed time.

It should be noted that the flowchart in FIG. 11 describes the content used time measurement control process in a case where the used time is added for the number of the license-consuming elements that are used in parallel, but the present invention is not limited to this. That is to say, in a case where three license-consuming elements are used in parallel for one minute, the content used time measured by the use status management unit 608 in equation 1 is calculated as three minutes that is the measured elapsed time multiplied by three. The present invention, however, is not limited to this. For example, even in the case where plural license-consuming elements are used in parallel, the number of the license-consuming elements that are in use may be calculated as "1" and the elapsed time measured by the timer may be added to the used time. Namely, the content used time may be calculated based on whether or not at least one license-consuming element is used. In this case, even in the case where three license-consuming elements are used in parallel for one minute, the content used time is calculated as one minute that is the measured elapsed time.

Figure 12:
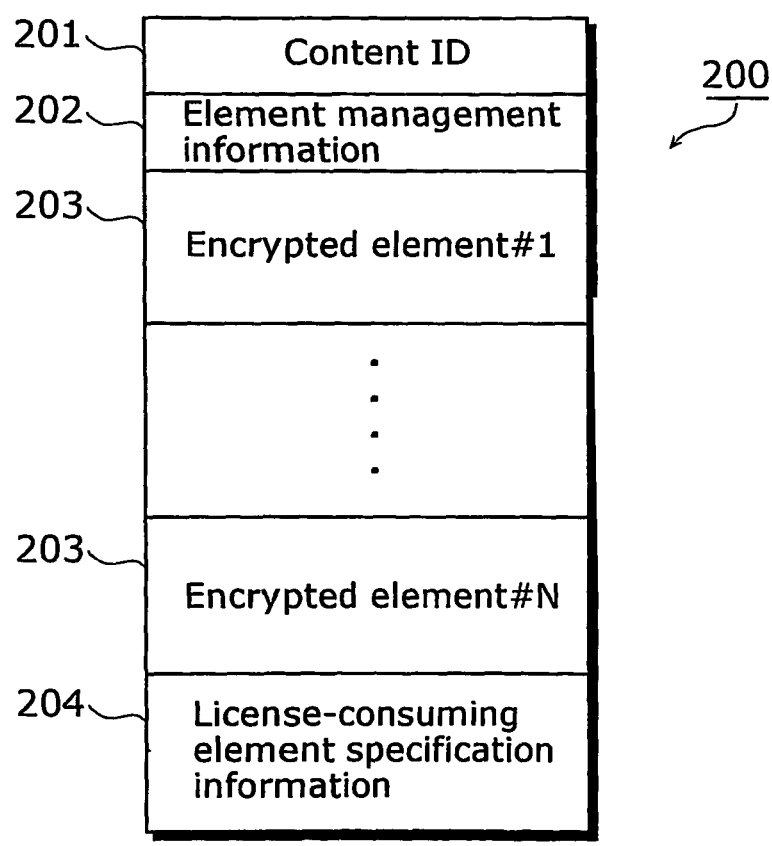
FIG. 12 shows another example of the content data shown in FIG. 2.

It should be noted that, in the present embodiment, the license-consuming element specification information 204 is included in the license 500, but the present invention is not limited to this. FIG. 12 shows another example of the content data 200 shown in FIG. 2. That is to say, the license-consuming element specification information 204 may be included in the content data 200, but not in the license 500, as shown in FIG. 12.

Figure 13:
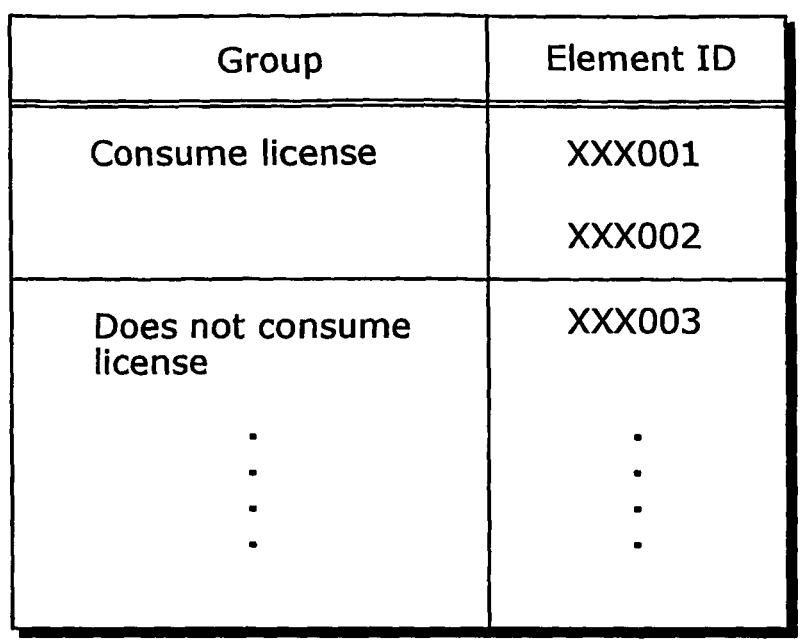
FIG. 13 shows another example of the license-consuming element specification information, shown in FIG. 4.
Figure 14:
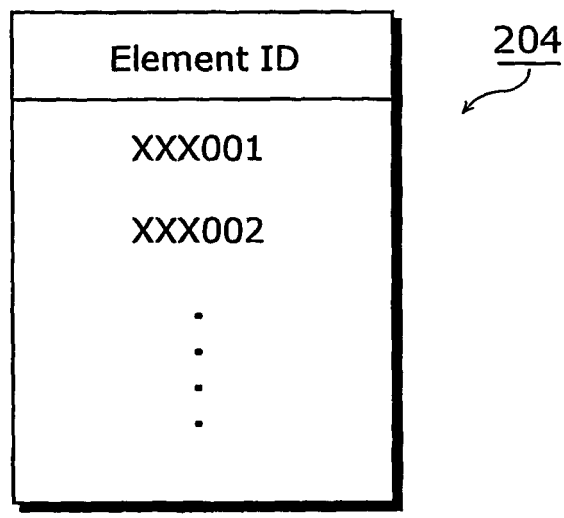
FIG. 14 shows another example of the license-consuming element specification information shown in FIG. 4.

In the present embodiment, it is described that the license-consuming element specification information 204 is information composed of the element ID 300 and the license consumption flag 400, but the present invention is not limited to this. FIG. 13 shows another example of the license-consuming element specification information 204 shown in FIG. 4. For instance, as shown in FIG. 13, the license-consuming element specification information 204 may be shown in a list where the elements are divided into two groups: one group for the elements that consume license; and the other group for the elements that do not consume license, and each element ID can be listed together. FIG. 14 shows yet another example of the license-consuming element specification information 204. As shown in FIG. 14, the license-consuming element specification information 204 may be a list in which only the element IDs 300 of the license-consuming elements are listed.

FIG. 15 is another example of the license-consuming element specification information 204 shown in FIG. 4. As shown in FIG. 15, it may be the information composed of the element ID 300 and a degree of license consumption 1300. The degree of license consumption 1300 is information indicating the amount consumed for each of the elements, and the use status management unit 608 measures the content used time based on this information. For example, in a case of using the element whose degree of consumption is set as "consume half" for one minute, the content used time is "30 seconds".

Figure 16:
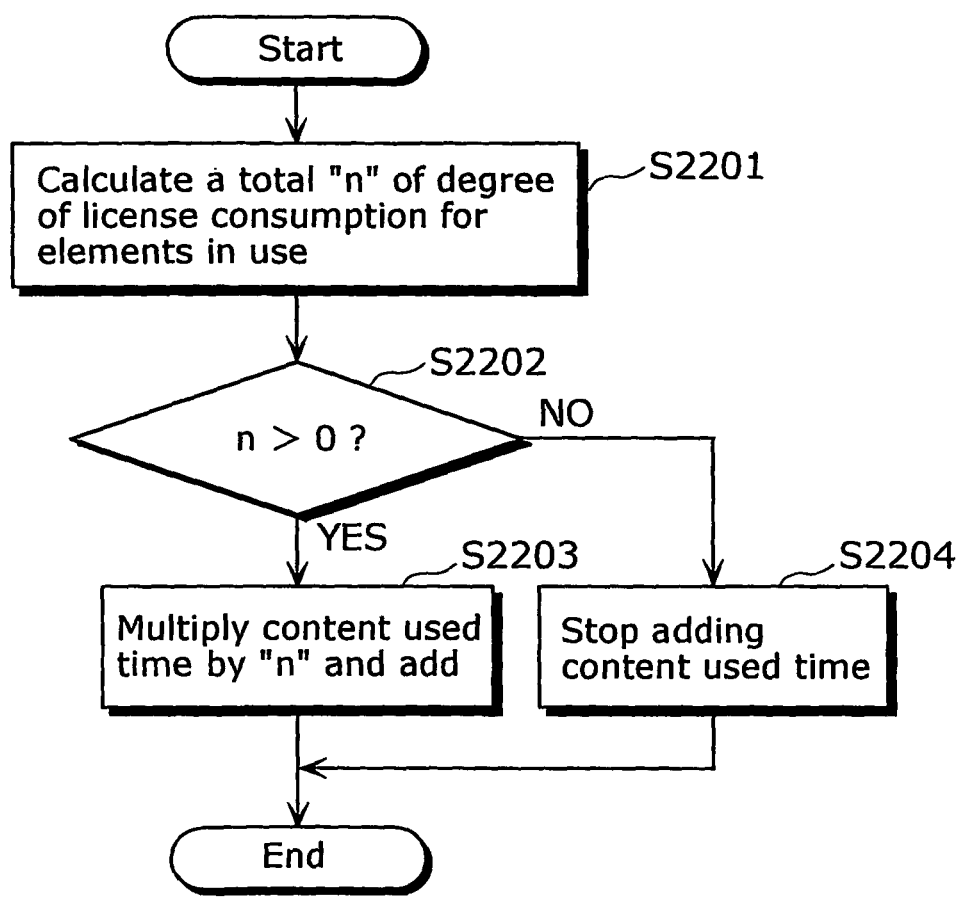
FIG. 16 is a flowchart showing another example of the operation used in the content used time measurement control process shown in FIG. 11.

FIG. 16 is a flowchart showing another example of the operation used in the content used time measurement control process shown in FIG. 11. More specifically, it is a flowchart showing the operation in a case where the use status management unit 608 measures the content used time according to the license-consuming element specification information 204 shown in FIG. 15.

S2201: The use status management unit 608 refers to the license-consuming element specification information 204 shown in FIG. 15 included in the license 500 in use, and calculates a total "n" (n is a positive real number) of the degree of license consumption 1300 for the elements that are in use. For example, in a case where the element with the element ID "xxx001", the element with the element ID "xxx002" and the element with the element ID "xxx003" are in use, "n" can be obtained based on the equation n=0.5+2+0=2.5

S2202: The use status management unit 608 judges whether or not the calculated total "n" of the degree of license consumption 1300 is larger than "0". In a case where the "n" is greater than "0", the process goes on to S2203. In a case where the "n" is not greater than "0", namely, n=0, the process goes on to S2204.

S2203: The use status management unit 608 multiplies the content used time by the number "n" and adds it. More specifically, when performing the processing of S2203 for the first time after having received the instruction to start using the content, the use status management unit 608, for example, activates the timer which measures the elapsed time with the initial value set as "0". When performing the processing of S2203, the use status management unit 608 then adds the elapsed time measured up to then to the value held in the register after multiplying it by the number "n", so that the timer starts measuring the elapsed time starting from "0". Here, the initial value at the register indicates "0". Therefore, for example, in a case where the element with the element ID "xxx001", the element with the element ID "xxx002 and the element with the element ID "xxx003" are used in parallel for one minute, the content used time is calculated as 2 minutes and 30 seconds.

S2204: The use status management unit 608 stops adding time to the content used time.

Thus, by calculating the content used time, the time during which the content is used can be controlled according to the degree of license consumption 1300 for each element. It should be noted that, in the flowchart in FIG. 16, it is described that a total "n" of a degree of license consumption 1300 for the elements in use is calculated, and the measured elapsed time is multiplied by "n" and then added to the value held in the register. The present invention, however, is not limited to this. For example, the element having a largest degree of license consumption 1300 (largest value="m"), among the elements which are in use, is used for the calculation of the content used time, and the elapsed time measured while the elements are replayed may be multiplied by "m" and then added to the value held in the register. Namely, in a case where the element with the element ID "xxx001", the element with the element ID "xxxOO2" and the element with the element ID "xxx003", which are indicated in the license-consuming element specification information 204 shown in FIG. 15, are used in parallel for one minute, the element having the largest value "m" as "2" for a degree of license consumption 1300 is used for the calculation. In this case, the content used time is calculated as 2 minutes.

It should be noted that, in the embodiment described above, the elements which consume license are specified based on the license-consuming element specification information 204, but the present invention is not limited to this. More specifically, the encrypted elements #1 and #2 in the content data 200 shown in FIG. 2 may be predetermined as the elements which consume license. In this case, where one element is a license-consuming element, for example, staffing data or the like may be filled in the encrypted element #2 while the elements which do not consume license may be written in the following encrypted elements including the encrypted element #3.

It should be noted that, in the embodiment described above, when a difference between the content usable time (or authorized number of times for content use) and the content used time (number of times using content) becomes "0", namely, the right to use the content authorized by the license 500 is completely used, all the elements become unavailable, but the present invention is not limited to this. For example, the elements which do not consume license may be available even after the complete use of the right authorized by the license 500.

Figure 17:
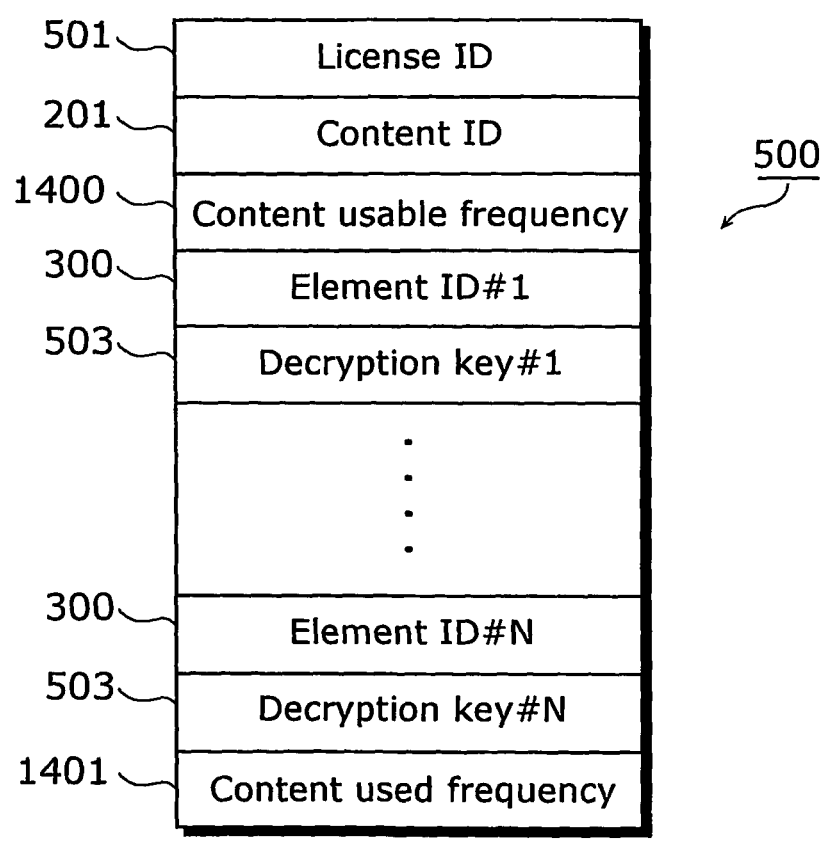
FIG. 17 shows another example of the license shown in FIG. 5.

In the present embodiment, it is explained that the license 500 includes the content usable time 502 represented as a right to use the content, but the present invention is not limited to this. FIG. 17 shows another example of the license 500 shown in FIG. 5. For example, as shown in FIG. 17, the license 500 may include a content usable frequency 1400 and a content used frequency 1401 instead of the content usable time 502 and the content used time 504 shown in FIG. 5. The content usable frequency 1400 is the number of times allowed for using a content while the content used frequency 1401 is the number of times for which a content is actually used. In this case, where the license-consuming elements are used, the use status management unit 608 controls the use of the content, regarding that the content is used "once".

Thus, according to the present embodiment as described above, in a case of controlling the use of the content being composed of, for instance, tune data, lyric data, image data of the artist and other data, the problem that the user cannot replay the tune data since the right to use the content is completely used due to the long browsing of the lyric data can be prevented by setting the tune data as a license-consuming element while other data is not set as such.

Second Embodiment

The following describes the digital content distribution system according to the second embodiment of the present invention. The present digital content distribution system has the configuration almost the same as the one used in the digital content distribution system according to the first embodiment. Since the operation differs partly between the first and second embodiments, the difference is focused here, and the same reference numerals are put for the same components shown in the diagram.

The overall configurations of the digital content distribution system and the user terminal 110, according to the second embodiment, are as same as those described in the first embodiment, therefore, the descriptions are omitted here.

Figure 18:
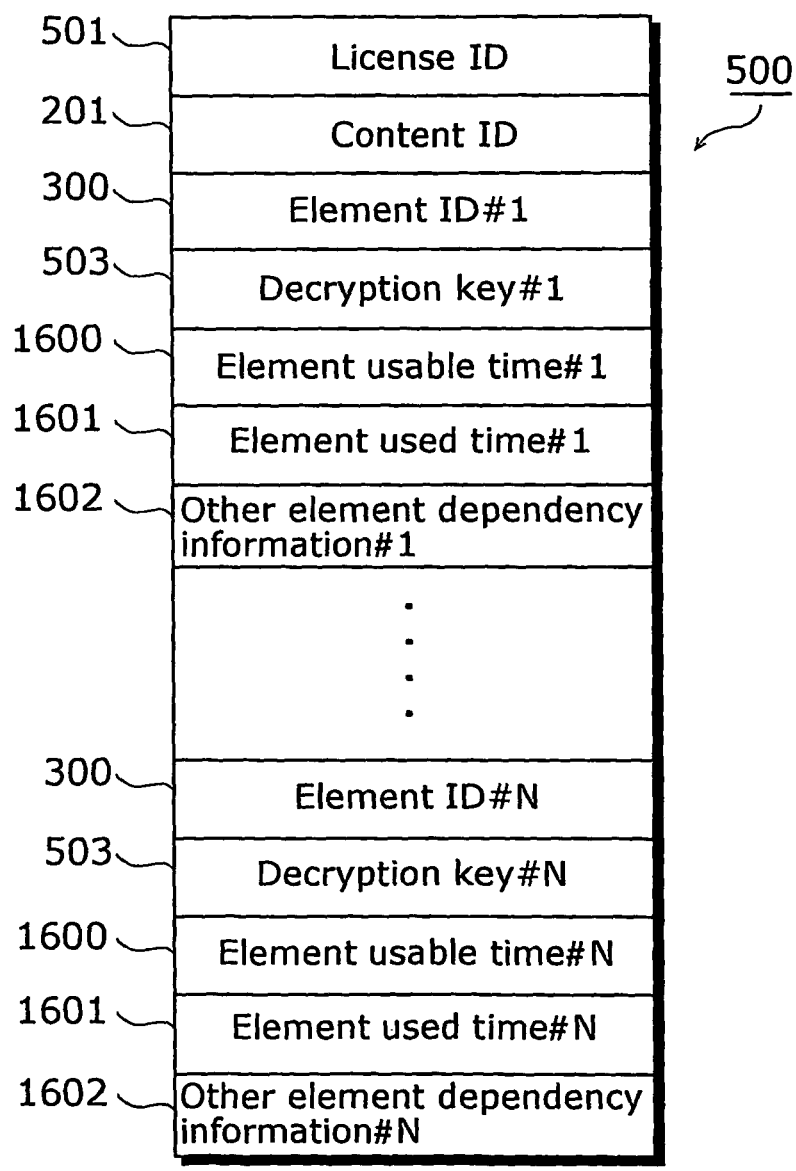
FIG. 18 shows an example of the license according to the second embodiment of the present invention.

FIG. 18 shows a composition of the license 500 according to the second embodiment. The license 500 used in the second embodiment differs from the one described in the first embodiment in the respect that the former has an element usable time 1600 and an element used time 1601 for describing the usable time and the used time for each element, instead of the content usable time 502 and the content used time 504, and further includes other element dependency information 1602. The other element dependency information 1602 is information in which each status of use for other elements is described as a condition for each element under which the element becomes available. For example, a condition such that "the right to use the element with the element ID "xxx111" is still left" is described.

Figure 19:
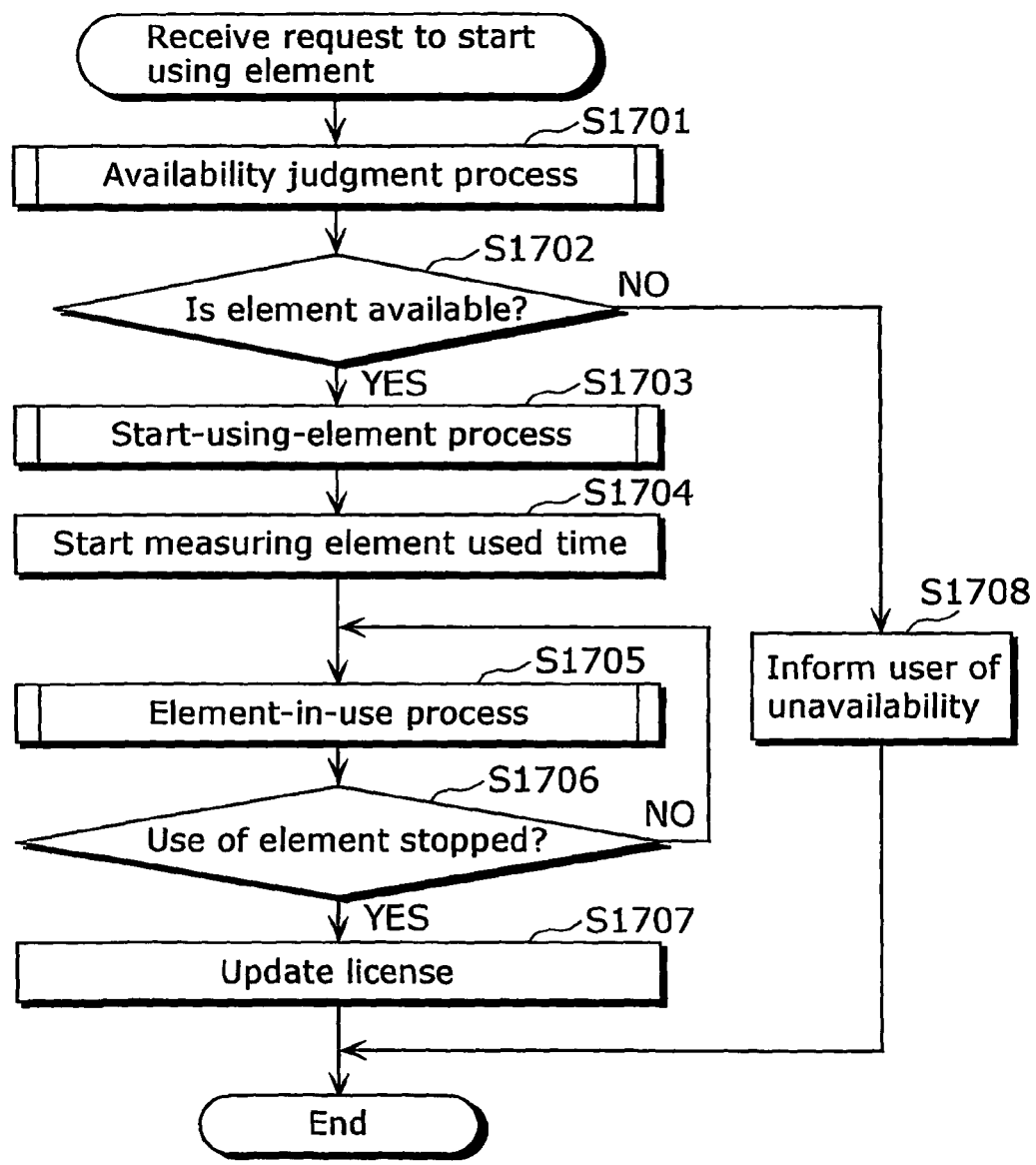
FIG. 19 is a flowchart showing the operation start-using-element process performed by the user terminal 110.

FIGS. 19-21 are flowcharts respectively showing the operation performed under the digital content distribution system according to the second embodiment.

Firstly, the operation of using an element, performed by the user terminal 110 according to the second embodiment, is described with reference to the flowchart shown in FIG. 19.

The availability judgment unit 604 receives a request to start using an element from the user β through the user's operation input unit such as a keyboard or the like which is not shown in the diagram. The request includes the information for specifying the element which the user β desires to start using.

S1701: The availability judgment unit 604 performs availability judgment process, which is to be mentioned later with reference to the flowchart in FIG. 20, and judges whether or not the element specified by the user β is available.

S1702: In a case where the availability judgment unit 604 judges that the element is available in S1701, the process goes on to S1703. In a case where the availability judgment unit 604 judges that the element is unavailable, the process goes on to S1708.

S1703: The process of starting the use of the element, namely, the start-using-element process, described with reference to the flowchart in FIG. 9, is operated, and the use of the element starts as requested by the user β.

S1704: The use status management unit 608 starts measuring the time during which the element is used.

S1705: The process while the element is in use, that is, the element-in-use process which is to be mentioned later with reference to FIG. 21, is operated.

S1706: The use status management unit 608 judges whether or not the use of the element is stopped. In a case where it is stopped, the process goes on to S1707. In a case where it is not stopped, the process returns to S1705.

S1707: The license updating unit 609 updates the element used time 1601 in the license 500 based on the used time measured by the use status management unit 608.

S1708: The user is informed that the element is unavailable.

The following describes the availability judgment process of S1701 in FIG. 19 with reference to the flowchart in FIG. 20.

S1801: The availability judgment unit 604 examines whether or not the license database 601 has the license 500 authorizing the use of the element which the user β desires to use.

In a case where such license 500 is found, the process goes on to S1802. In a case where such license 500 is not found, the process goes on to S1805.

S1802: The availability judgment unit 604 judges whether or not the element used time 1601 corresponding to the element which the user β desires to use is less than the element usable time 1600. In a case where the element used time 1601 is less than the element usable time 1600, the process goes on to S1803. In a case where the element used time 1601 is not less than the element usable time 1600, the process goes on to S1805.

S1803: The availability judgment unit 604 judges whether or not the condition described in the other element dependency information 1602 is satisfied. In a case where the condition is satisfied, the process goes on to S1804, and in a case where the condition is not satisfied, the process goes on to S1805.

S1804: The availability judgment unit 604 judges that the element is available.

S1805: The availability judgment unit 604 judges that the element is unavailable.

The following describes the process in S1705 in FIG. 19, performed while the element is in use, namely, the element-in-use process, with reference to the flowchart in FIG. 21.

S1901: The use status management unit 608 judges whether or not the usable time of the element is still left. It should be noted that the judgment is based on whether or not the condition expressed in equation 2 is satisfied. In a case where the condition is satisfied, it is judged that the usable time of the element is left, and in a case where the condition is not satisfied, it is judged that the usable time of the element is not left.

(element used time measured by the use status management unit 608)<(element usable time 1600 of the element corresponding to the element in use)−(element used time 1601 of the element corresponding to the element in use)  (equation 2)

In a case where it is judged that the usable time of the element is left in S1901, the process goes on to S1902. In a case where it is judged that no such time is left, the process goes on to S1904.

S1902: The availability judgment unit 604 judges whether or not the condition described in the other element dependency information 1602 is satisfied. In a case where the condition is satisfied, the process goes on to S1903, and in a case where the condition is not satisfied, the process goes on to S1904.

S1903: The use status management unit 608 judges whether a request to stop using the element is received from the user β. In a case where the request is received, the process goes on to S1904, and in a case where the instruction is not received, the process terminates.

S1904: The use status management 608 instructs the replay/display unit 607 to stop the replay or display of the element. The replay/display unit 607 stops the replay or display of the element according to the instruction.

Thus, according to the present embodiment as described above, in a case of controlling the use of the content being composed of, for instance, tune data, lyric data, image data of the artist and other data, the problem that the user cannot replay the tune data because of the long browsing of the lyric data can be prevented by setting the element usable time 1600 corresponding to the lyric data and the image data of the artist, as "unlimited", and indicating "the right to use the tune data is left" in the other element dependency information 1602. At the same time, the control to stop also the use of other elements at the time when the right to use the tune data becomes ineffective is made possible.

The user terminal according to the present invention is practical as a content reproduction apparatus, a personal computer, a Personal Digital Assistant (PDA), a cell phone, and a Set Top Box (STB), each being equipped with a communication function. The right management server according to the present invention is useful as a server which distributes, to the user terminal, a license to use a content via a broadcast network, the Internet, or the like. The digital content distribution system according to the present invention is practicable as a content use system in which the right management server distributes, to the user terminal, a license for a digital content such as movie and music via the communication network as mentioned above, and the user terminal uses the digital content based on the distributed license, or the like.

The invention claimed is:

1. A computing device comprising:
a memory;
a processor; and
a digital content reproduction apparatus for reproducing content including a plurality of individually-reproducible elements, the content including the plurality of individually-reproducible elements being reproduced according to license information,
wherein the digital content reproduction apparatus comprises a license information obtainment means for obtaining the license information via one of a communication network, a broadcast wave, and a recording medium, the obtained license information indicating an entire authorized amount of reproduction of the content as a whole and not indicating an authorized amount of reproduction of each individually-reproducible element of the plurality of individually-reproducible elements of the content,
wherein the plurality of individually-reproducible elements includes: a license-consuming element that consumes the entire authorized amount of reproduction of the content as a whole indicated by the obtained license information; and an element that does not consume the entire authorized amount of reproduction of the content as a whole,
wherein the digital content reproduction apparatus further comprises:
a reproducibility judgment means for (i) specifying, from individually-reproducible elements, of the plurality of individually-reproducible elements of the content, that are being reproduced, one or more of the license-consuming elements, each license-consuming element being an individually-reproducible element, of the plurality of individually-reproducible elements of the content, (ii) calculating an amount of reproduction of the content as a whole, by adding each individual amount of reproduction of the one or more specified license-consuming elements, (iii) comparing the calculated amount of reproduction of the content as a whole and the entire authorized amount of reproduction of the content as a whole indicated by the obtained license information, and (iv) judging that the one or more specified license-consuming elements is reproducible when the calculated amount of reproduction of the content as a whole is smaller than the entire authorized amount of reproduction of the content as a whole indicated by the obtained license information, and that the one or more specified license-consuming elements is not reproducible when the calculated amount of reproduction of the content as a whole is larger than the entire authorized amount of reproduction of the content as a whole indicated by the obtained license information; and
a reproduction means for (i) reproducing the one or more specified license-consuming elements when the reproducibility judgment means judges that the one or more specified license-consuming elements is authorized to be reproduced, and (ii) preventing a reproduction of the one or more specified license-consuming elements when the reproducibility judgment means judges that the one or more specified license-consuming elements is not authorized to be reproduced,
wherein the license information includes license-consuming element information which identifies the one or more license-consuming elements,
wherein the license-consuming element information includes, for each of the one or more license-consuming elements, a degree of consumption indicating a degree of license consumption by the license-consuming element, and
wherein the reproducibility judgment means calculates the entire amount of reproduction of the content as a whole by multiplying (a) a time used for reproducing a specified license-consuming element of the one or more the license-consuming elements and (b) the degree of consumption associated with the specified license consuming element of the one or more the license-consuming elements.

2. The computing device according to claim 1,
wherein the license-consuming element information includes, for each individually-reproducible element of the plurality of individually-reproducible elements of the content, a respective element identifier and a flag, each respective element identifier identifying a respective individually-reproducible element of the plurality of individually-reproducible elements of the content, and each flag indicating whether or not the respective individually-reproducible element of the content is a license-consuming element, and
wherein the reproducibility judgment means (i) identifies an element, from the plurality of individually-reproducible elements that are reproduced during the reproduction of the content, using the respective element identifier included in the license-consuming element information, (ii) refers to the flag corresponding to the element identifier of the identified element, and (iii) specifies the one or more license-consuming elements.

3. The computing device according to claim 1,
wherein (i) the individually-reproducible elements of the content are divided into two groups, a first group of license-consuming elements that consume the license and a second group of non-license-consuming elements that do not consume the license, and (ii) one or more elements belonging to each group of the two groups are listed with a respective element identifier for identifying a respective element of the content in the license-consuming element information, and wherein the reproducibility judgment means specifies one of the one or more license-consuming elements by comparing the element identifier of the individually-reproducible elements that are reproduced during the reproduction of the content and the element identifier belonging to the group of license-consuming elements described in the license-consuming element information.

4. The computing device according to claim 1, wherein, in the license-consuming element information, each license-consuming element of the one or more license-consuming elements is listed with a respective element identifier for identifying a respective license-consuming element, and wherein the reproducibility judgment means specifies one of the one or more license-consuming elements by comparing the element identifier of the individually-reproducible elements that are reproduced during the reproduction of the content and the element identifier listed in the license-consuming element information.

5. The computing device according to claim 1, wherein, when a plurality of the license-consuming elements that are being reproduced are specified in the plurality of individually-reproducible elements of the content, the reproducibility judgment means calculates a total degree of consumption by adding the degrees of consumption associated with the specified plurality of the license-consuming elements, and calculates the entire amount of the reproduction of the content as a whole by multiplying a total time used for reproducing the specified plurality of the license-consuming elements and the total degree of consumption.

6. The computing device according to claim 1, wherein, when a plurality of the license-consuming elements that are being reproduced are specified in the plurality of individually-reproducible elements of the content, the reproducibility judgment means calculates the entire amount of the reproduction of the content as a whole by multiplying (a) a total time used for reproducing specified plurality of the license-consuming elements by (b) a largest degree of consumption among the degrees of consumption associated with the specified plurality of the license-consuming elements.

7. The computing device according to claim 1, wherein the reproducibility judgment means (i) calculates a total amount of time used for reproducing each of the one or more specified license-consuming elements specified during reproduction of the content, and (ii) determines the calculated total amount of time as the calculated amount of reproduction of the content as a whole.

8. The computing device according to claim 1, wherein the content includes a plurality of encrypted elements, wherein the license information includes one or more decryption keys for decrypting, respectively, one or more encrypted elements included in the content, and wherein the reproduction means reproduces encrypted elements judged as being authorized to be reproduced from the one or more encrypted elements included in the content after decrypting the one or more encrypted elements using the one or more decryption keys included in the license information.

9. A digital content reproduction method of using a computing device including a memory storing a program for a digital content apparatus and a processor, the digital content reproduction method causing the digital content reproduction apparatus to reproduce content including a plurality of individually-reproducible elements, the content including the plurality of individually-reproducible elements being reproduced according to license information through an execution of the program by the processor, wherein the digital content reproduction method comprises obtaining, by the digital content reproduction apparatus, the license information via one of a communication network, a broadcast wave, and a recording medium, the obtained license information indicating an entire authorized amount of reproduction of the content as a whole and not indicating an authorized amount of reproduction of each individually-reproducible element of the plurality of individually-reproducible elements of the content, wherein the plurality of individually-reproducible elements includes: a license-consuming element that consumes the entire authorized amount of reproduction of the content as a whole indicated by the obtained license information; and an element that does not consume the entire authorized amount of reproduction of the content as a whole, wherein the digital content reproduction method further comprises:

specifying, (i) by the digital content reproduction apparatus and (ii) from individually-reproducible elements, of the plurality of individually-reproducible elements of the content, that are being reproduced, one or more of the license-consuming elements, each license-consuming element being an individually-reproducible element, of the plurality of individually-reproducible elements of the content;

calculating, by the processor, an amount of reproduction of the content as a whole, by adding each individual amount of reproduction of the one or more specified license-consuming elements;

comparing, by the digital content reproduction apparatus, the calculated amount of reproduction of the content as a whole and the entire authorized amount of reproduction of the content as a whole indicated by the obtained license information;

judging, by the digital content reproduction apparatus, that the one or more specified license-consuming elements is reproducible when the calculated amount of reproduction of the content as a whole is smaller than the entire authorized amount of reproduction of the content as a whole indicated by the obtained license information, and that the one or more specified license-consuming elements is not reproducible when the calculated amount of reproduction of the content as a whole is larger than the entire authorized amount of reproduction of the content as a whole indicated by the obtained license information;

reproducing, by the digital content reproduction apparatus, the one or more specified license-consuming elements, when the judging of whether or not the one or more specified license-consuming elements is authorized to be reproduced judges that the one or more specified license-consuming elements is authorized to be reproduced; and preventing, by the digital content reproduction apparatus, a reproduction of the one or more specified license-consuming elements, when the judging of whether or not the one or more specified license-consuming elements is authorized to be reproduced judges that the one or more specified license-consuming elements is not authorized to be reproduced, wherein the obtained license information includes license-consuming element information which identifies the one or more license-consuming elements, wherein the license-consuming element information includes, for each of the one or more license-consuming elements, a degree of consumption indicating a degree of license consumption by the license-consuming element, and wherein the digital content reproduction method further includes calculating, by reproducibility judgment means, the entire amount of reproduction of the content as a whole by multiplying (a) a time used for reproducing a specified license-consuming element of the one or more the license-consuming elements and (b) the degree of consumption associated with the specified license consuming element of the one or more the license-consuming elements.

10. A computer-readable recording medium having a program recorded thereon, the program for reproducing content including a plurality of individually-reproducible elements, the content including the plurality of individually-reproducible elements being reproduced according to license information, and wherein the program causes a computer to execute a method comprising a license information obtainment step of obtaining license information via one of a communication network, a broadcast wave, and a recording medium, the obtained license information indicating an entire authorized amount of reproduction of the content as a whole and not indicating an authorized amount of reproduction of each individually-reproducible element of the plurality of individually-reproducible elements of the content, wherein the plurality of individually-reproducible elements includes: a license-consuming element that consumes the entire authorized amount of reproduction of the content as a whole indicated by the obtained license information; and an element that does not consume the entire authorized amount of reproduction of the content as a whole, wherein the method further comprises:

a reproducibility judgment step of (i) specifying, from individually-reproducible elements, of the plurality of individually-reproducible elements of the content, that are being reproduced, one or more of the license-consuming elements, each license-consuming element being an individually-reproducible element, of the plurality of individually-reproducible elements of the content, (ii) calculating an amount of reproduction of the content as a whole, by adding each individual amount of reproduction of the one or more specified license-consuming elements, (iii) comparing the calculated amount of reproduction of the content as a whole and the entire authorized amount of reproduction of the content as a whole indicated by the obtained license information, and (iv) judging that the one or more specified license-consuming elements is reproducible when the calculated amount of reproduction of the content as a whole is smaller than the entire authorized amount of reproduction of the content as a whole indicated by the obtained license information, and that the one or more specified license-consuming elements is not reproducible when the calculated amount of reproduction of the content as a whole is larger than the entire authorized amount of reproduction of the content as a whole indicated by the obtained license information; and a reproduction step of (i) reproducing the one or more specified license-consuming elements when the reproducibility judgment step judges that the one or more specified license-consuming elements is authorized to be reproduced, and (ii) preventing a reproduction of the one or more specified license-consuming elements when the reproducibility judgment step judges that the one or more specified license-consuming elements is not authorized to be reproduced wherein the obtained license information includes license-consuming element information which identifies the one or more license-consuming elements, wherein the license-consuming element information includes, for each of the one or more license-consuming elements, a degree of consumption indicating a degree of license consumption by the license-consuming element, and wherein the method further includes calculating the entire amount of reproduction of the content as a whole by multiplying (a) a time used for reproducing a specified license-consuming element of the one or more the license-consuming elements and (b) the degree of consumption associated with the specified license consuming element of the one or more the license-consuming elements.

* * * * *